Dec. 29, 1959 H. M. GEYER 2,918,799
COMBINED LINEAR AND ROTARY ACTUATOR
Filed April 14, 1958
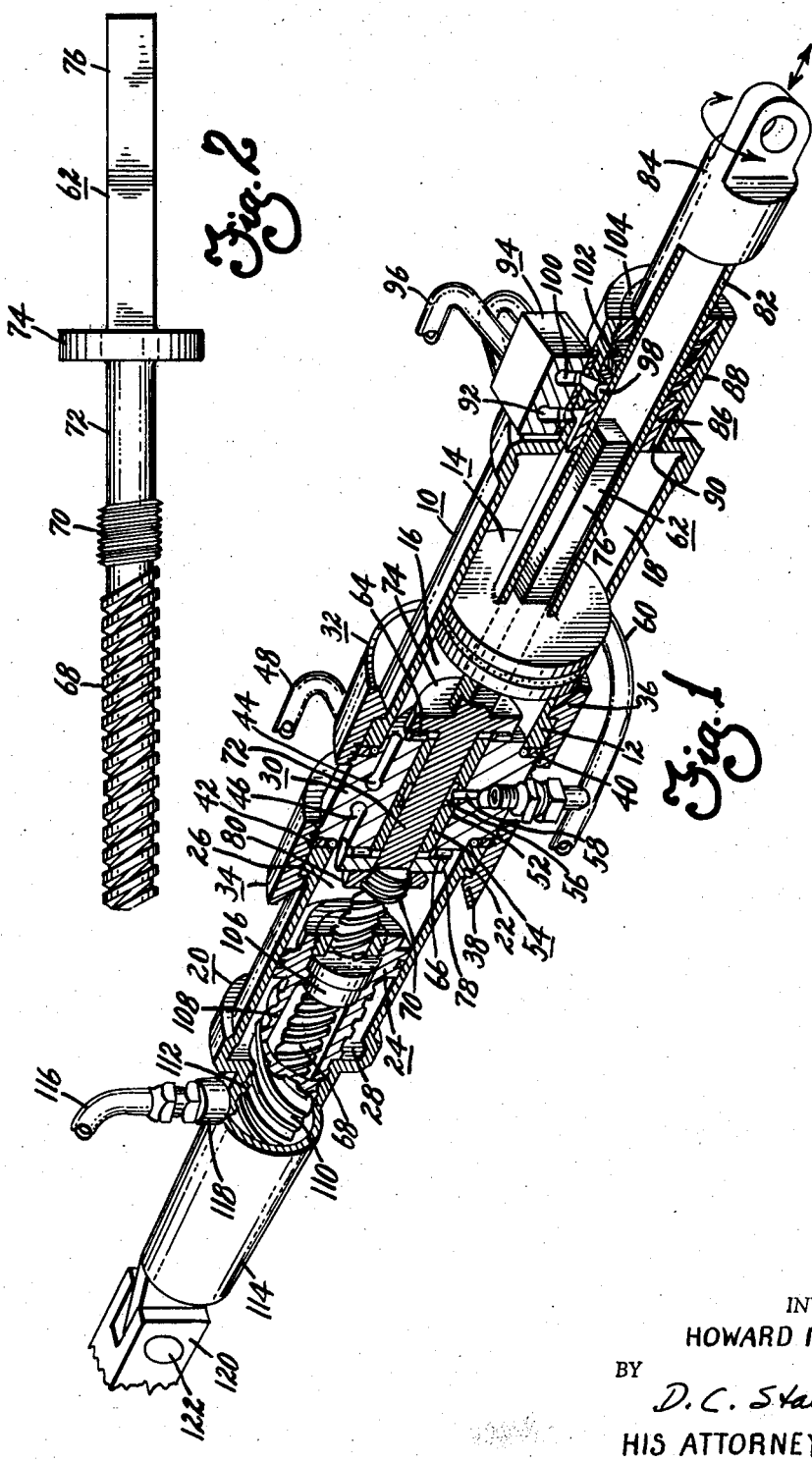
INVENTOR.
HOWARD M. GEYER
BY
D. C. Staley
HIS ATTORNEY

United States Patent Office 2,918,799
Patented Dec. 29, 1959

2,918,799

COMBINED LINEAR AND ROTARY ACTUATOR

Howard M. Geyer, Dayton, Ohio, assignor to General Motors Corporation, Detroit, Mich., a corporation of Delaware Application April 14, 1958, Serial No. 728,280

10 Claims. (Cl. 60—97)

This invention pertains to actuators, and particularly to hydraulic actuators for aircraft.

In some aircraft control systems it is necessary to impart angular as well as linear movement to a control device. Heretofore, two independent actuators have been utilized to position the control device, one actuator being of the rotary type and the other actuator being of the linear type. The present invention relates to a combined actuator assembly having a single output member which can be both rotated and moved linearly. Accordingly, among my objects are the provision of a combined linear and rotary actuator assembly; the further provision of an actuator assembly including an output member which can be rotated as well as reciprocated; and the still further provision of an actuator assembly including a single output member and a pair of pistons operatively connected to said member for effecting either rotary or linear movement of the output member.

The aforementioned and other objects are accomplished in the present invention by incorporating a screw shaft in an actuator assembly, the screw shaft having threaded connection with one piston and a polygonal end portion having a sliding connection with the other piston. Specifically, the actuator assembly comprises a pair of stationary cylinders, each cylinder having a reciprocable piston mounted therein for fluid pressure actuation in both directions. The cylinders are interconnected by an intermediate bulkhead assembly and are attached to a fixed support. One of the pistons has an axially extending rod which extends outside of the cylinder assembly and constitutes an output member. A screw shaft, or rotatable element, is rotatably journalled within the bulkhead, the screw shaft having a threaded portion extending into one of the actuator cylinders and a polygonal portion extending into the other actuator cylinder. The polygonal portion is slidably received in a complementary shaped opening in the piston which carries the output member such that the output member and its piston are free to move linearly relative to the screw shaft assembly but are constrained for rotation therewith.

The other end of the screw shaft assembly threadedly engages a nut carried by the other piston. This piston has an axially extending skirt with exterior threads. The exterior threads mate with complementary threads formed on the inner wall of the cylinder. Accordingly, reciprocation of the piston is accompanied by angular movement thereof, which angular movement is multiplied and imparted to the screw shaft assembly, since the threads on the screw shaft and the threads on the skirt are of opposite sense. Thus, if the threads on the screw shaft are in the right hand direction, the threads on the piston skirt are in the left hand direction.

When the linear actuator piston is subjected to differential pressure, the output member can be reciprocated between predetermined limits as determined by the stroke of the piston. When the rotary piston is subjected to a pressure differential in either direction, the screw shaft assembly is rotated, and by reason of the screw shaft assembly having a driving connection with the linear piston, the linear piston and the output member are also rotated. The two actuator pistons can be subjected to pressure differentials either simultaneously or independently of each other so as to effect the desired movement of the output member.

Further objects and advantages of the present invention will be apparent from the following description, reference being had to the accompanying drawing, wherein a preferred embodiment of the present invention is clearly shown.

In the drawing:

Figure 1 is an isometric view, partly in section and partly in elevation, depicting a combined linear and rotary actuator constructed according to this invention.

Figure 2 is a view in elevation of the screw shaft assembly.

With particular reference to Figure 1, the actuator assembly comprises a pair of coaxial cylinders 10 and 20 having open ends which are connected to a bulkhead assembly 30 by a pair of collars 32 and 34 which threadedly engage the bulkhead assembly 30. The collars 32 and 34 have internal shoulders 36 and 38, respectively, which engage external shoulders 12 and 22 respectively on cylinders 10 and 20. Suitable sealing means 40 and 42 are interposed between the ends of the cylinders 10 and 20 and the bulkhead assembly 30. The bulkhead assembly 30 is formed with a pair of internal passages 44 and 46 which communicate with extend conduits, only one of which, 48, is shown in the drawing. The passage 44 communicates with the cylinder 10, and the passage 46 communicates with the cylinder 20 for supplying or draining hydraulic fluid from the extend chambers of actuator cylinders 10 and 20. In addition, the bulkhead assembly 30 is formed with a central through bore 52 within which a pressure drop bushing 54 is disposed. The pressure drop bushing 54 has an internal annular groove 56 and a radial passage 58 communicating with a drain conduit 60. A screw shaft assembly 62 is rotatably supported by needle bearing assemblies 64 and 66 disposed on opposite end surfaces of the bulkhead assembly 30.

With particular reference to Figure 2, the screw shaft assembly 62 includes a high lead right hand threaded portion 68, a low lead right hand threaded portion 70, a cylindrical portion 72, a shoulder 74 and a square end portion 76. The smooth cylindrical portion 72 is disposed within the pressure drop bushing 54 as shown in Figure 1, and the shoulder 74 is associated with the needle bearing assembly 64. A thrust washer 78 is retained in position by a nut 80 which threadedly engages the portion 70 of the screw shaft assembly, the thrust washer 78 being associated with the needle bearing assembly 66. Thus, the needle bearing assemblies 64 and 66 journal the screw assembly 62 for rotation relative to the bulkhead assembly 30 and the shoulder 74 and thrust washer 78 prevent axial movement of the screw shaft assembly relative to the bulkhead assembly.

A reciprocable piston 14 is disposed within the cylinder 10, the piston 14 dividing the cylinder 10 into an extend chamber 16 and a retract chamber 18. The piston 14 has a square hole therethrough through which the square end 76 of the screw assembly 62 extends.

The piston 14 includes an integral rod 82 which extends outside of the cylinder 10. The outer end of the piston rod 82 is formed with a suitable fixture 84 by which it can be connected to a load device, not shown. A pressure drop bushing 86 is disposed between the rod 82 and a reduced end portion 88 of the cylinder 10. The pressure drop bushing 86 is formed with an external annular groove 90 which communicates with a passage 92 in a porting block 94 attached to the rod end portion 88 of the cylinder. The passage 92 in the porting block is connected with a retract conduit 96. The low pressure end of the pressure drop bushing 86 communicates with a passage 98 connecting with a passage 100 in the porting block 94. The passage 100 is connected to the drain conduit 60. A suitable metallic low pressure seal assembly 102 is held in position by a nut 104 which threadedly engages the rod end portion 88.

The cylinder 20 contains a reciprocable piston 24 which divides the cylinder into an extend chamber 26 and a retract chamber 28. The piston 24 carries a nut 106 which is constrained for movement with the piston 24 and threadedly engages the screw shaft portion 68. In addition, the piston 24 has an axially extending skirt 108 having external threads 110 of the left hand type. The threads 110 on the skirt 108 engage complementary threads 112 formed on the internal surface of a reduced end portion 114 of the cylinder 20. The retract chamber 28 of the cylinder 20 communicates with a retract conduit 116 through a porting member 118 attached to the cylindrical extension 114, the space between the threads 110 and 112 enabling such communication. The outer end of the cylindrical extension 114, which is closed, is attached to a fixed support member 120 in the form of a clevis, the clevis being interconnected with a fixture on the cylindrical extension 114 by a pin 122.

Operation of the combined linear and rotary actuator is as follows. When the extend chamber 16 of the cylinder 10 is subjected to hydraulic fluid under pressure, and the retract chamber 18 is connected to drain, the piston 14 will move to the right, as viewed in Figure 1, thereby effecting linear outward movement of the piston rod 82. In order to facilitate circulation of hydraulic fluid for actuator cooling, the pressure drop bushings 54 and 86 are incorporated in the actuator assembly. These pressure drop bushings constitute self-cleaning orifices and operate in the manner set forth in my copending application Serial No. 648,361. Thus, when the extend chamber 16 is subjected to pressure, a metered amount of hydraulic fluid will flow between the inner surface of the pressure drop bushing 54 and the cylinder surface 72 through the annular groove 56 and thence through the passage 58 to the drain conduit 60. This metered amount of cooling fluid prevents the fluid from congealing in the conduits or the actuator cylinder due to high ambient temperatures.

In order to effect inward movement of the piston rod 82, the retract chamber 18 is subjected to pressure and the extend chamber 16 is connected to drain. Under these conditions, the piston 14 will move to the left as viewed in Figure 1, thereby effecting inward linear movement of the piston rod 82. When the retract chamber 18 is subjected to pressure, a metered amount of fluid can flow between the pressure drop bushing 86 and the rod 82 through the passages 88 and 100 to the drain line 60.

In order to effect rotary movement of the output member 82 in the clockwise direction as viewed in Figure 1, the extend chamber 26 of the actuator cylinder 20 is subjected to pressure while the retract chamber 28 is connected to drain. This will cause movement of the piston 24 to the left as viewed in Figure 1, which movement is accompanied by counterclockwise rotation of the piston 24 due to the threaded connection between the skirt 108 and the cylindrical extension 114. Combined counterclockwise rotation and movement of the piston 24 to the left will effect clockwise rotation of the screw shaft assembly 62, and the polygonal end portion 76 of the screw shaft assembly will rotate the piston 14 and the output member 82. When the extend chamber 26 is subjected to fluid under pressure, a metered amount of fluid can flow between the pressure drop bushing 54 and the cylindrical portion 72 to the drain conduit 60 for actuator cooling.

In order to effect counterclockwise rotary movement of the output member 82, the retract chamber 28 is subjected to fluid under pressure while the extend chamber 26 is connected to drain. Accordingly, the piston 24 will move to the right, as viewed in Figure 1, which movement is accompanied by clockwise rotation thereof. This combined movement of the piston 24 will effect counterclockwise rotation of the screw shaft assembly 62 and the output member 82.

From the foregoing it is readily apparent that the present invention materially reduces the complexity of mechanism required to effect both linear and rotary movement of a control device. Moreover, the actuator assembly is designed so that the output member can have imparted thereto independent linear and rotary movement, or a combined linear and rotary movement depending upon the manner in which the two actuator pistons are controlled.

While the embodiment of the invention as herein disclosed constitutes a preferred form, it is to be understood that other forms might be adopted.

What is claimed is as follows:

1. A combined linear and rotary actuator including, a pair of coaxially interconnected stationary cylinders, a reciprocable piston disposed in each cylinder capable of fluid pressure actuation in both directions, a single rotatable and linearly movable output member attached to one of said pistons and extending outside of said interconnected cylinders, and rotatable means operatively connected with the other piston and slidably connected with said one piston whereby movement of said other piston will effect rotation of said one piston and said output member and reciprocation of said one piston will effect linear movement of said output member.

2. A combined linear and rotary actuator including, a pair of interconnected stationary cylinders, a reciprocable piston disposed in each cylinder capable of fluid pressure actuation in both directions, an output member attached to one of said pistons and extending outside of said interconnected cylinders, an element rotatably supported within said interconnected cylinders and operatively connected to said other piston so as to rotate upon movement of said other piston, and means interconnecting said element and said output member permitting linear movement of said output member relative to said element but precluding relative rotation therebetween whereby movement of said one piston will effect linear movement of said output member and movement of said other piston will effect rotary movement of said output member through said element.

3. A combined linear and rotary actuator including, a pair of coaxially stationary cylinders, a bulkhead disposed between and interconnecting said cylinders, a reciprocable piston disposed in each cylinder capable of fluid pressure actuation in both directions, an ouput member connected to one of said pistons and extending outside of said cylinders, an element rotatably journalled in said bulkhead and operatively connected to said other piston so as to rotate upon movement of said other piston, and means slidably connecting said element and said one piston permitting linear movement of said one piston relative to said element but precluding relative rotation therebetween whereby reciprocation of said one piston will effect linear movement of said output member and movement of said other piston will effect rotary movement of said output member through said element and said one piston.

4. A combined linear and rotary actuator including, a pair of stationary cylinders, a bulkhead disposed between and interconnecting said cylinders, a reciprocable piston disposed in each cylinder capable of fluid pressure actuation in both directions, an output member connected to one of said pistons and extending outside of said cylinders, an element rotatably journalled in said bulkhead having portions extending into both cylinders, means operatively interconnecting one extending portion of said element with said other piston whereby movement of said other piston effects rotation of said element and means connecting the other extending portion of said element and said output member so as to permit linear movement of said output member relative to said element but precluding relative rotation therebetween whereby movement of said one piston will effect linear movement of said output member and movement of said other piston will effect rotary movement of said output member.

5. A combined linear and rotary actuator including, a pair of coaxial stationary cylinders, a bulkhead disposed between and interconnecting said cyinders, a reciprocable piston disposed in each cylinder capable of fluid pressure actuation in both directions, an element rotatably journalled in said bulkhead having a polygonal portion extending into one of said cylinders and a threaded portion extending into the other cylinder, means interconnecting the threaded portion of said element and said other piston whereby movement of said other piston will effect rotation of said element, and means interconnecting said polygonal portion and said output member so as to permit linear movement of said output member relative to said element but precluding relative rotation therebetween whereby movement of said one piston will effect linear movement of said output member and movement of said other piston will effect rotary movement of said output member through said element.

6. A combined linear and rotary actuator including, a pair of stationary cylinders, a bulkhead disposed between and interconnecting said cylinders, a reciprocable piston disposed in each cylinder capable of fluid pressure actuation in both directions, an output member attached to one of said pistons and extending outside of said cylinders, an element rotatably supported in said bulkhead having a threaded portion, a nut carried by the other piston and engaging said threaded portion whereby reciprocation of said other piston will effect rotation of said element, and means interconnecting said element and said output member permitting linear movement of said output member relative to said element but precluding relative rotation therebetween whereby movement of said one piston will effect linear movement of said output member and movement of said other piston will effect rotary movement of said output member.

7. A combined linear and rotary actuator including, a pair of stationary cylinders, a bulkhead disposed between and interconnecting said cylinders, a reciprocable piston disposed in each cylinder capable of fluid pressure actuation in both directions, an output member connected to one of said pistons and extending outside of said cylinders, a screw shaft assembly rotatably supported in said bulkhead having oppositely extending threaded and polygonal portions, said polygonal portion extending through said one piston whereby said one piston is constrained for rotation with said screw shaft but free to move lineally relative thereto, and a nut carried by said other piston engaging said threaded portion of said screw shaft whereby rotation of said other piston will effect rotation of said screw shaft and said output member.

8. The actuator set forth in claim 7 wherein said other piston has an axially extending skirt having threads of an opposite sense to the threads on said screw shaft, and wherein said other cylinder has a complementary threaded portion engaging threads on said skirt so that reciprocation of said piston is accompanied by rotation thereof.

9. An actuator assembly including, a pair of stationary cylinders, a bulkhead disposed between and inter-connecting said cylinders, a reciprocable piston disposed in each cylinder, an output member connected to one of said pistons and extending outside of said cylinders whereby reciprocation of said one piston will effect linear movement of said output member, an element rotatably supported in said bulkhead and operatively connected to the other piston so as to rotate upon reciprocation of said other piston, and means slidably connecting said element and said one piston permitting reciprocation of said one piston relative to said element but precluding relative rotation therebetween whereby rotation of said element caused by reciprocation of said other piston will rotate said one piston and said output member.

10. An actuator assembly including, a pair of coaxial stationary cylinders, a bulkhead disposed between and interconnecting said cylinders, a reciprocable piston disposed in each cylinder, one of said pistons having a rod extending outside of said cylinder and constituting an output member, and an element rotatably journalled in said bulkhead having a threaded portion operatively connected with said other piston and a polygonal portion extending through and slidably received by said one piston whereby reciprocation of said other piston will effect rotation of said element, said one piston and said output member, and reciprocation of said one piston will effect linear movement of said output member.

References Cited in the file of this patent

UNITED STATES PATENTS

| | | |
|---|---|---|
| 2,036,967 | Lundberg et al. | Apr. 7, 1936 |
| 2,041,517 | Rule | May 19, 1936 |
| 2,238,814 | Kneass | Apr. 15, 1941 |
| 2,616,323 | Leifer | Nov. 4, 1952 |